(12) United States Patent
Spink et al.

(10) Patent No.: US 6,483,948 B1
(45) Date of Patent: Nov. 19, 2002

(54) MICROSCOPE, IN PARTICULAR A STEREOMICROSCOPE, AND A METHOD OF SUPERIMPOSING TWO IMAGES

(75) Inventors: Roger Spink, Balgach (CH); Bernhard Braunecker, Rebstein (CH)

(73) Assignee: Leica AG, Heerbrugg (CH)

( * ) Notice: Subject to any disclaimer, the term of this patent is extended or adjusted under 35 U.S.C. 154(b) by 0 days.

(21) Appl. No.: 08/849,707
(22) PCT Filed: Dec. 22, 1994
(86) PCT No.: PCT/EP95/05112
§ 371 (c)(1),
(2), (4) Date: Sep. 9, 1997
(87) PCT Pub. No.: WO96/20421
PCT Pub. Date: Jul. 4, 1996

(30) Foreign Application Priority Data

Dec. 23, 1994 (CH) .............................................. 3932/94

(51) Int. Cl.⁷ .............................. G06T 3/00; G06T 5/00; G06T 17/00; H04N 13/02
(52) U.S. Cl. ..................... 382/255; 382/131; 382/154; 382/275; 348/46; 348/79; 345/424; 345/633; 606/130
(58) Field of Search ................................. 382/255, 254, 382/275, 131, 128, 154; 348/25, 42, 46, 47, 54, 80, 79; 356/904; 359/376, 377, 378, 466, 470, 462, 368, 369; 345/424, 632, 633; 600/417, 429, 407; 606/130; 250/201.3

(56) References Cited

U.S. PATENT DOCUMENTS

| | | | |
|---|---|---|---|
| 4,722,056 A | * 1/1988 | Roberts et al. | 606/130 |
| 4,786,154 A | * 11/1988 | Fantone et al. | 348/25 |
| 5,359,417 A | * 10/1994 | Muller et al. | 250/201.3 |
| 5,513,005 A | * 4/1996 | Muller et al. | 606/130 |
| 5,526,812 A | * 6/1996 | Dumoulin et al. | 606/130 |

(List continued on next page.)

FOREIGN PATENT DOCUMENTS

| | | | |
|---|---|---|---|
| EP | 0 629 963 A2 | 12/1994 | G06F/15/42 |
| FR | 2 682 778 | 4/1993 | |

OTHER PUBLICATIONS

Grimson, W.E.L. et al, "An Automated Registration Method for Frameless Stereotaxy, Image Guided Surgery, and Enhanced Reality Visualization", IEEE Transactions on Medical Imaging, vol. 15, No. 2, Apr. 1996, pp. 129–140.*

Edwards, Philip J. et al, "Design and Evaluation of a System for Microscope–Assisted Guided Interventions (MAGI)", IEEE Transactions on Medical Imaging, vol. 19, No. 11, Nov. 2000, pp. 1082–1093.*

(List continued on next page.)

Primary Examiner—Scott Rogers
(74) Attorney, Agent, or Firm—Hodgson Russ LLP

(57) ABSTRACT

The invention concerns an imaging system comprising a first device (82) for acquiring image data for an object (93) using light, in particular a microscope, and a second device (94) for acquiring and displaying image data (in particular, of the kind not immediately visible to the eye) for the object (93) using (in particular invisible) radiation, preferably electromagnetic wave or particle radiation such as X-rays (X-ray or CT photographs), MRI or positron radiation. The system is also provided with a superimposition device (95) for superimposing the two sets of image data to form a single image which can be turned towards an observer. The optical parameters of the first device (82), e.g. the microscope and its image distortions, are incorporated in the image to be superimposed, thereby providing the observer with a dimensionally and geometrically accurate display of the two superimposed images.

14 Claims, 4 Drawing Sheets

U.S. PATENT DOCUMENTS

| | | | | |
|---|---|---|---|---|
| 5,531,520 A | * | 7/1996 | Grimson et al. | 382/131 |
| 5,579,772 A | * | 12/1996 | Kinukawa et al. | 128/665 |
| 5,657,128 A | * | 8/1997 | Muller et al. | 348/79 |
| 5,694,142 A | * | 12/1997 | Dumoulin et al. | 345/156 |
| 5,697,368 A | * | 12/1997 | Luber et al. | 600/407 |
| 5,704,897 A | | 1/1998 | Truppe | 600/117 |
| 5,740,802 A | * | 4/1998 | Nafis et al. | 600/407 |
| 5,867,309 A | * | 2/1999 | Spink et al. | 359/377 |
| 6,043,890 A | * | 3/2000 | Spink et al. | 356/152.1 |
| 6,069,733 A | * | 5/2000 | Spink et al. | 359/369 |
| 6,337,765 B1 | * | 1/2002 | Spink et al. | 359/369 |

OTHER PUBLICATIONS

Tang, San–Lik et al, "Augmented Reality Systems for Medical Imaging", IEEE Engineering in Medicine and Biology, May/Jun. 1998, pp. 49–58.*

Kaneda, Kazufumi et al, "Image processing and synthesis for extended depth of field of optical microscopes", The Visual Computer, Springer–Verlag 1992, pp. 351–360.*

Bajura, M. et al, "Merging Virtual Objects with the Real World", ACM SIGGRAPH Computer Graphics, Proceedings of the 19th annual conference on computer graphics and interactive techniques Jul. 1992, vol. 26 Issue 2, pp. 203–210.*

Scanning Microscopy, vol. 4, No. 4, 1990 (pp. 825–828).

* cited by examiner

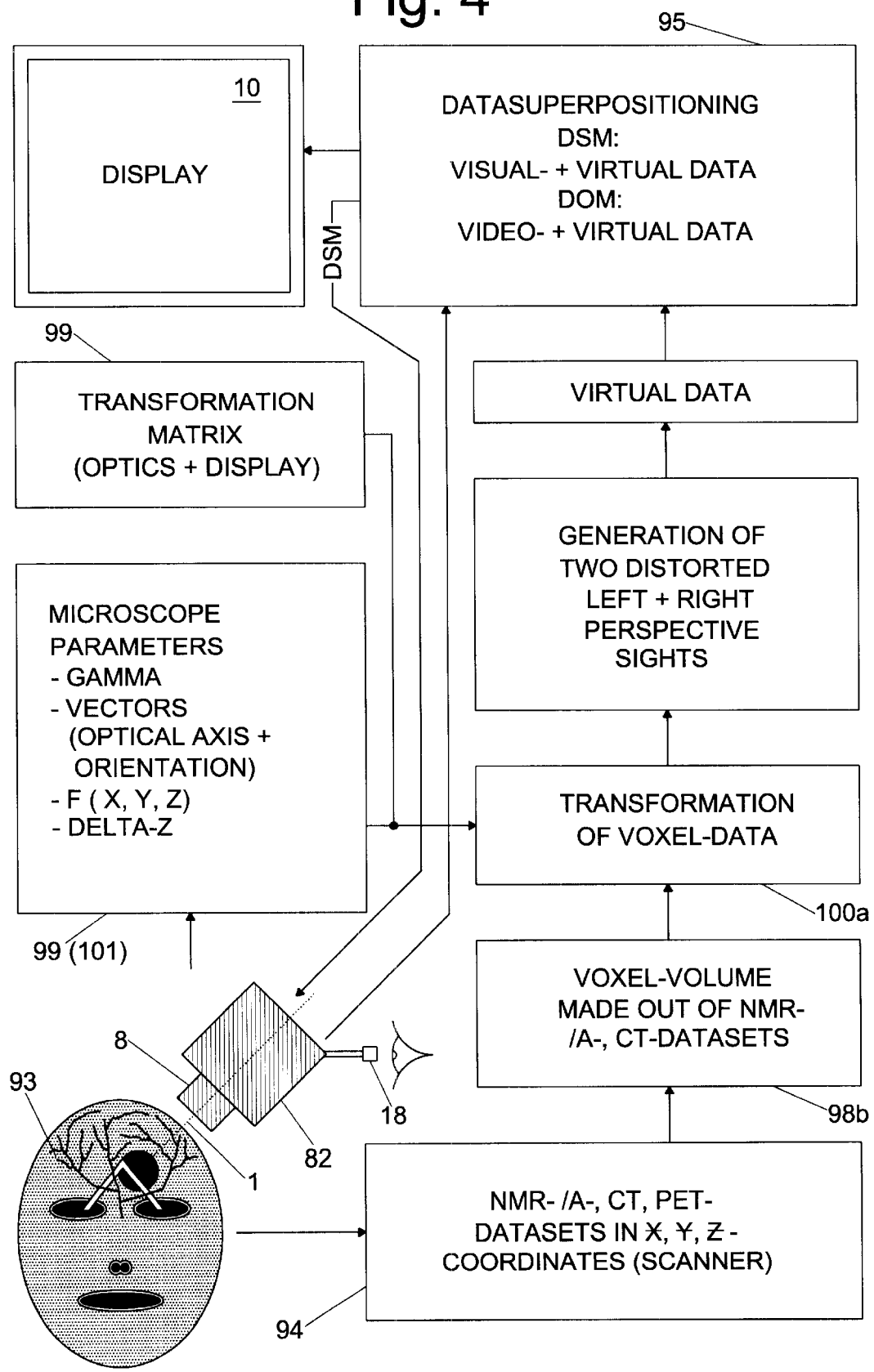

MICROSCOPE, IN PARTICULAR A STEREOMICROSCOPE, AND A METHOD OF SUPERIMPOSING TWO IMAGES

BACKGROUND OF THE INVENTION

The invention involves an image representing device, in particular a microscope, in particular a stereomicroscope, for example an operation microscope, in particular a video stereomicroscope that is linked with an electronic data processing unit and/or a display and a method of superimposing an image from a second image representing device such that the two images conform geometrically.

Such microscopes are used in technology, among other things, e. g. materials technology, material analysis, silicon technology, criminology, etc., in particular, however, also in medicine for diagnosis, serological examinations, in operations, etc.

Detailed examples will be given below of the use of the device in the sphere of operation microscopy. The use in other spheres, however, likewise falls within the sphere of application of the invention.

Operation microscopes are used by the operating surgeon for the optical magnification of the operating area. Operation technology in this regard has made such great progress that magnifications in the range of 50 times and more are no rarity. A magnification sometimes leads to a situation in which the operating surgeon cannot always unambiguously identify the area that he is viewing through the microscope with an actual place on the patient. A helpful superimposition of the image seen microscopically with intensified contours, for example, or other markings is therefore often desirable. For the fulfillment of this desire essentially two processes are known in the prior art:

Edge improvements, image coloring, contrast improvements, etc. are effected by means of electronic image processing. The image data required for this are obtained directly from the image being viewed itself and simply transformed mathematically. If such data are superimposed on the observed image data, no significant problem arises in the process, since these image data are returned to the same image location from which they were obtained.

In other designs beam splitters to which displays are allocated through which the images in the light path can be reflected are linked with the microscope light path, and these images are superimposed on the images actually seen in the eye of the viewer. Such images, e. g. images of the same place but taken at an earlier time, are often difficult to superimpose on the image that is seen, since they may be taken with different magnifications, other microscope settings, etc.

A special sphere for the superimposition of images arises, for example, in the use of computer tomography (CT), magnetic resonance imaging (MRI), or positron emission tomography (PET) in connection with stereo microscopy. Data from CT and MRI are obtained in order to have a sectional image of the area of interest, which in the final analysis after computer processing makes it possible to display a three-dimensional model that is true to life on a computer monitor (stereo screen). In this regard see Chapter 1 ("Interventional Video Tomography (IVT)"), pages 1–25, Chapter 2 ("Digital Substraction Angiography (DSA)"), pages 27–34, and Chapter 3 ("Technical Specification"), pages 35–41, written by M. Truppe in the company journal of ARTMA BIOMEDICAL, INC. (Apr. 7, 1994).

U.S. Pat. No. 4,722,056 and CH-A-684291 describe devices that theoretically make superimposition possible. A computer-assisted operation microscope, which was put on the market under the designation MKM, can mark both risk zones and tissue structures and also superimpose three-dimensional diagnostic data that are obtained before the stereoscopic viewing on the image seen in the microscope in order to make forward-looking operating possible. An exact superimposition, so that outline contours from the CT, for example, coincide with the stereoscopically viewed outline contours, however, is not possible with this.

Through three-dimensional images it is possible for the attending physicians to localize the kind and extent of the diseased area better and plan appropriate operation steps better in advance. The three-dimensional image data provided by the computer are now in accordance with the invention supposed to be accessible to an operating surgeon in an improved manner immediately before an operation too, specifically in such a way that these image data are exactly superimposed on the image seen in the operation microscope at the same time and in the right position; this may be also in a masking mode or a transparent mode, which makes it possible for the operating surgeon to see as it were under the surface of the place actually being seen and in this way to make possible improved planning and guidance of the operating instrument. This should result in a higher precision of positioning and shorter operation time than is possible today.

In order for this superimposition to take place optimally the optical parameters of the image seen and the parameters of the (three-dimensional) image to be superimposed must be known, since such a superimposition makes sense only if the image seen through the microscope and the superimposed image data conform geometrically. Geometrical correctness is not satisfactory to date for the known superimpositions.

SUMMARY OF THE INVENTION

Overcoming this situation is one of the main objectives of the invention.

The objective is attained, for example, through an adaptive control apparatus according to the present invention;

The first application of an adaptive control apparatus to modify an image to be displayed depending on another displayed image leads to the desired success. In this regard it is first of all immaterial where the actual image superimposition takes place. The following variants are listed as examples:

When one two-dimensional image is displayed exclusively for one of the two eyes of a viewer and another two-dimensional image is displayed for the other viewer eye, the superimposition takes place in the brain of the viewer. It can, however, just as well take place in the computer in order to deliver the superimposed image as an integrated image signal to a monitor or similar device; both signals, however, can also be delivered directly to a monitor or similar device that has, for example, two input channels—if appropriate, for a right and left image channel of a pair of stereo images. Further a purely optical superimposition is conceivable, e. g. in the intermediate image of an optical light path or something similar.

Various qualitatively different measures are provided for the control apparatus in the framework of the invention to detect and correct the image geometry or imaging parameters.

It must always be ensured that the control apparatus detects primary (operational) imaging parameters (eyeline, thus system alignment or viewing angle, perspective, etc., e.

g. microscope alignment) and uses them for adapting the image formation geometry of the second image information. This is implemented, for example, through picking up the direction data and settings of the adjustment means of the first device, e. g. from the stand or through monitoring the microscope position through an independent sensing device, such as an ultrasound or infrared position or coordinate determination device (e. g. PIXSYS™) and the device for setting the magnification of the microscope.

An improved adaptation results if the secondary imaging parameters too (e. g. field of vision, magnification, depth of focus) are detected and used for adapting the image formation geometry of the second image information. This is implemented, for example, through picking up the actual z-distance (this is the distance from the object being viewed to the objective bearing surface) from the object viewed and a magnification measurement (gamma measurement) in the light path of the first device.

Obviously it is optimal when the tertiary imaging parameters (e. g. aberration of the metric, distortion depending on the z-distance and gamma measurement in the light path of the first device) are detected and used to correct the image formation geometry of the second image information. Such tertiary imaging parameters are preferably carried out through comparative measurements on known objects (e. g. illustrations with a known geometric pattern or three-dimensional objects with known geometric dimensions that can be utilized for calibration purposes or to detect the imaging errors).

The primary and secondary imaging parameters are type-specific parameters that depend on the nature and geometric or optical design of the first device, while tertiary imaging parameters are series-specific. They depend on the quality of the individual optical components and their assembly and on the adjustment of each individual apparatus.

Naturally an adaptive control apparatus is preferred that detects primary, secondary, and tertiary imaging parameters and on their basis modifies the second image data that are to be superimposed and superimposes them. In the process the second and tertiary imaging parameters may be evaluated first, if appropriate, and only then is a conformation of the coordinate systems of the two devices undertaken in which one image is rotated or pivoted by the computer into the other, which is already displayed in a geometrically correct manner, this, naturally, preferably three-dimensionally in each case.

The necessary calibration processes involved may be carried out using the whole adjustment range of the system data of the devices where, for example, a permanent calibration is made during a slow adjustment of all the system data of an apparatus and the various computational formulas that are derived in the process are recorded continuously and stored in a memory, so that later it will be possible to superimpose the appropriate correction value for each individual setting during the operation of the apparatus.

In order to reduce somewhat the quantity of image data that must be processed by the computer and to speed up the processing, a further development of the invention is foreseen in which the necessary correction rule for the type-specific algorithms (optical distortions that can be determined mathematically, etc.) are calculated ahead of time and stored in the device, so that in the actual adaptation an automatic calculation will take place first and only thereafter a measurement with further adaptation results.

To facilitate and accelerate the elimination of the series-specific imaging parameters, it is preferably proposed to subject each device to a calibration process after which the calibration parameters that have been obtained are stored in a memory and are automatically utilized in the adaptation of the second image data. Thus, as soon as images from another image source are superimposed in a particular type of device or piece of equipment and a particular piece of equipment from a particular series, these images will be modified with the stored values in accordance with a calibration carried out before the delivery of the equipment in such a way that the images can be superimposed congruently, to the extent that they come from the same object. In the process it makes sense to carry out the calibration for each individual device. If needed it is even conceivable that a standard component appropriate for the calibration can be used that will be directly available to the local service personnel or even the user, to make recalibration possible from time to time.

The advance calculations and calibrations or storage of correction values that have been described are suitable for equipment that has a limited memory or computing capacity. If there is adequate computing capacity and appropriate computing speed, it is also conceivable to supply equipment that is optimized to a certain degree but without precalculating the type-specific algorithms and to build into the computer an image recognition apparatus to which the precise dimensions of a standard component are known; in certain intervals it calls preferably for a calibration routine in which through video viewing of the standard component alone the deviation from the stored dimensions are detected and from them are determined the correction parameters, which are written to the superimposed images in each case. As a standard component an object is preferred that presents suitable, recognizable structures for the imaging rays of the first and second apparatus.

In calibration it makes sense to proceed as follows. A test object with dimensions that are standardized—and preferably recognizable for all image producing light paths that are used—is scanned with its actual dimensions using CAD and stored in a memory by a computer as a voxel volume with external dimensions conforming to reality. Subsequently this test object is placed in front of the light path of the first apparatus, which has a stereoscopic video recording apparatus (e. g. one CCD per light path of a stereomicroscope) and through this observes from several perspectives. Each of the views that are allocated to the individual perspectives is taken and converted into a voxel volume by means of a computer program, which [voxel volume] thus corresponds to reality, since it was modified (e. g. distorted) by the imaging parameters. The voxel volume so obtained is then compared—e. g. by voxels—with the voxel volume that was originally input into the computer. The differences that result from this are recognized as a computational formula and stored in the memory. As soon as another object is placed in the light path of a microscope with the same setting, it can be modified by means of the computational formula in such a way that it corresponds to its true proportions inside the computer or memory and can also be displayed as such.

In most cases the process just described with the recalculation using the voxel volume is carried out only because resort is made to the voxel volume when one wants to look under the surface of the object being viewed in the "masking mode," as is made possible in the correct position through the invention. Then, namely, the voxel volume beneath the place viewed by the microscope is taken away by layers as necessary, so that one can look into the depth by layers. Naturally the 3-D display of all or a part of the voxel volume is also possible. For this a weighting that can be set optically or using software of the image brightness of the microscope image or the superimposed image is possible. For pure calibration the analysis of the pure projection of the standard component being viewed is sufficient through which its recognized edge lines or their corner points are stored as vectors and can be processed further. On the other hand, and this is an important point of one of the embodiments of the invention, other "correct" data, e. g. from a CT, etc., that are available through the computer can be revised with these computational formulas in order to correspond geometrically correctly to distorted microscopic image data, for example.

Obviously it is often important to take into account the actual position of an object in space in this regard, especially in stereotactic operations or the like. For this a position recognition device is foreseen in connection with the invention that measures both the object (test object) and the position of the microscope in space. As an example, the system of the company Pixsys is suitable as a position recognition device in which IR transmitters or IR reflectors are mounted on the object and on the camera at known intervals and their position in space is determined by the system and recorded for further processing. The invention is not confined to this system, however. For most embodiments it is important, in any case, for sensors or signal markers to be arranged on the microscope that work together with signal markers or sensors located in space to define the position of the microscope in space. For example, instead of the sensor-signal marker arrangement a pure video image processing could be used in which one or two fixed video cameras viewed the microscope and after advance calibration calculated the spatial position of the microscope by means of 3-D image processing. Alternatively, of course, the MKM system in the stand that was already mentioned can also be used in which sensors in the stand or its joints determine the position of the microscope.

It does not matter which of the images finally displayed to the user is used for the corrections. It is just as conceivable to adapt the image of the optical light path to that of the nonoptical light path as vice versa, or also to create a "standard format" to which both the optical and nonoptical images may be adapted. Such a "standard format" could also be selected in such a way that it is closest to reality, or that it is portrayed virtually as a viewer of the corresponding object with average visual acuity would actually see the object. In the case of viewing through a microscope, the average viewer naturally would be reduced virtually in proportion to the magnification of the microscope.

As a rule imaging through CT is fairly close to reality. If, however, imaging distortions or something similar are present here too, these can also be taken into account through being compared to a calibrated object and displayed as a computational formula in order to superimpose these deviations on the image data from the first device too. Through such a "crosswise" superimposition of correction data, identical images are generated in both the first and second apparatus.

Of course it is also conceivable to correct the image data in each case after calibration in such a way that they correspond to the magnification of the object viewed that is only mathematically correct, whereupon the image data are also congruent and can be superimposed.

The adaptation of the image from the light ray path can take place in the first devices in which the light ray path is not sent directly to the viewer's eye, as is the case, for example, in videomicroscopes, where the viewer looks at a screen and not at the actual light ray path.

The superimposition of the images may take place either directly in the ocular light path or through the use of software in the computer, which displays the superimposed (combined) total image on a monitor. What is important in the final analysis is the fact that what the viewer sees is a superimposition that is in the correct scale and true to reality or appearance, as though both of the originally independent images had been viewed through one and the same optics with the same adjustment.

The approach to the problem in which it is required, for example, to eliminate the errors of the microscope's light path and thus to generate an image that is true to life, instead of transferring the errors to the other image, generally does not achieve a great deal for an operating surgeon, since in any event he does not work in a true life environment because of the magnification. His direct point of reference is the operating instrument, which he perceives in the field of vision of the microscope and moves by hand. An adjustment of the microscope light path or its optical elements leads automatically in accordance with a special embodiment of the invention to an adaptation of the reflected (superimposed) image, so that the operating surgeon can continue to work without interruption.

The term "display" as used in the invention encompasses, for example, screens, cathode ray tubes, etc. on which the images appear for the user. Such displays may be located either outside the microscope, e. g. as a computer monitor, or also as small displays that are built into an ocular light path in such a way that a user obtains not only an optical perception from the optical light path but also simultaneously superimposed an optical perception from the display. The purely electronic superimposition of images and their presentation on a display outside the microscope are encompassed by the invention, the ocular light path in one such case being reflected via a beam splitter into at least one image reception apparatus.

The term "videomicroscope" as used in the invention encompasses microscopes with at least one light optical ray path and at least one image reception apparatus for receiving and presenting the image seen via the light path on a display. Recently videostereomicroscopes in which two parallel light paths are provided and a 3-D image can be presented on the display have become a very widely used kind of videomicroscope. The invention includes, however, all other microscopes and endoscopes that have the devices described above and if necessary do without a stereoscopic light path.

Above all in operation microscopes and especially during an operation a lot of information comes in that may be of great significance for the surgeon. This includes, for example, information about the patient or his state of health such as pulse, blood pressure, oxygen content of the blood, etc., but also in addition to the images to be superimposed that have been mentioned, e. g. information concerning certain parameters of the microscope, information on the position of the operation field being observed, as well as control data that is transmitted arbitrarily via control elements such as the computer mouse or foot switch to the data processing or to control elements for the microscope in order to control it as needed, e. g. for focusing, etc.

Within the scope of the invention data can also be superimposed optically, through the electronic input of these data into the second image that is shown, or through the use of an additional display that is blended into the microscope light path. The superimposition of several different data items, e. g. also written data, is possible.

In the commonly-owned International Publications WO 9527917 and WO 9527918 claiming priority of Swiss patent application CH-1091/94-3 a device is described that makes it possible to carry out the superimpositions and data adaptation as fast as possible or in real time. A combination of the teaching of this invention with the teaching of the application mentioned thus brings further advantages. To this extent the content of the patent application mentioned is considered to lie within the framework of this disclosure.

CH-A-684291, which has been mentioned, describes a process for detecting the position of an image plane. This process could also find application in the framework of the invention in that one refrains preferably from a triangulation measurement, and the distance as well as the focus are determined directly through image evaluation (e. g. marginal definition evaluation).

To this extent and for practical implementation by an person skilled in the art the content of the patent application mentioned and CH-A-684291 are also regarded to lie within the framework of this disclosure.

BRIEF DESCRIPTION OF THE DRAWINGS

Further details and embodiments of the invention are revealed by the drawing. The figures portrayed there show.

DETAILED DESCRIPTION OF THE PREFERRED EMBODIMENTS

The figures are described coherently. The same reference numbers signify the same components. The same reference numbers with differing indices signify similar components or those having similar functions. The invention is not restricted to the exemplary embodiments that are portrayed. Especially in combination with the teachings of the following commonly owned International Publications WO 9527226 claiming priority of Swiss patent applications CH-949/94-2, CH-1525/94-0, and CH-1295/94-8; WO 9527917 and WO 9527918 each claiming priority of Swiss patent applications CH-1091/94-3, CH-1088/94-3, CH-1090/94-1, and CH-1089/94-5; and WO 9613743 claiming priority of Swiss patent application CH-3217/94 all kinds of other variations arise for a person skilled in the art. They all fall under the scope of invention disclosure content of this application. The attached list of reference numbers is accordingly compiled in a continuous manner.

Figure 1:
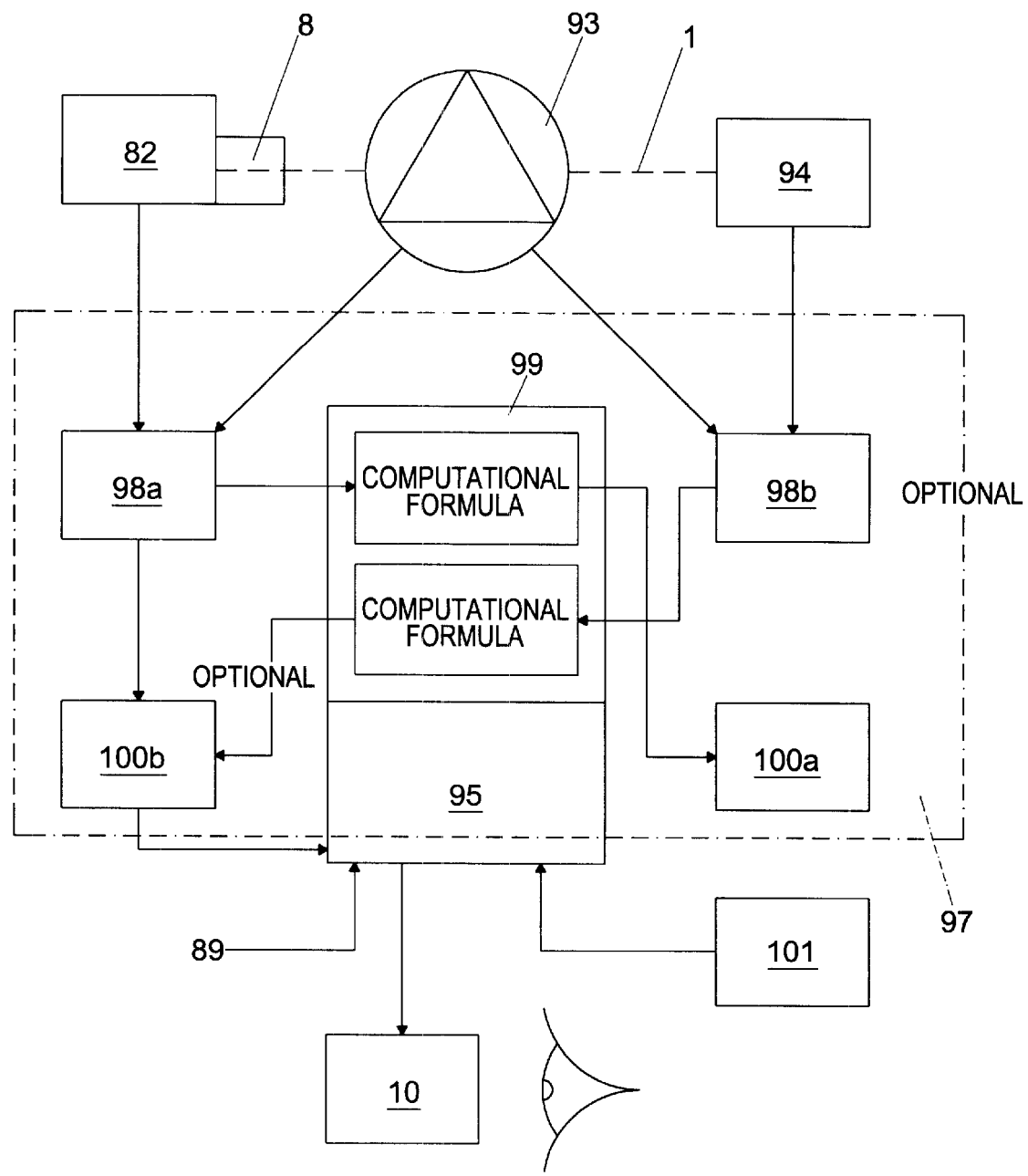
FIG. 1 a symbolic representation of the principle of a design in accordance with the invention with reciprocal data adaptation, FIG. 2 a symbolic representation of the principle of a position recognition device used in accordance with the invention, FIG. 3 a view of an operation microscope with preferred measurement arms and FIG. 4 a symbolic overview for the application of the invention.

The principle of the invention is made clear in FIG. 1.

A microscope 82 views with its light path 1 through its main objective 8 an object 93, which, to the extent it is used as a test or calibration specimen, has special contours that can be recognized through both optical and X-ray beams. In addition, the test specimen 93 is preferably also provided with light diodes for IR light so that its position in space may be measured and/or with cavities to hold appropriate substances that further permit the detection of the object through MRI, PET, or similar methods.

The image that is not imaged true to life as a consequence of optical secondary and tertiary imaging parameters is compared in a recognition unit 98a with a computer representation of the object 93 that has been previously stored and is true to life. From the differences between the two images that are ascertained a computational formula is developed, which is filed in a memory 99.

The same object 93 is viewed through a second apparatus 94 (e. g. an X-ray machine); a corresponding image is recorded. This image too is compared through software-controlled image interpretation in a second recognition unit 98b with the originally stored actual data for test specimen 93 from which, if appropriate, correction values or a computational formula are likewise derived, which likewise are filed in the memory 99. (This procedure is only optional, since X-ray data as a rule are corrected well geometrically and conform with reality.

Thus the image data of the second apparatus 94 are modified in a correction unit 100a by means of the first computational formula from the memory 99, in order to become congruent with the image data of the microscope 82.

In a superimposition device 95 the image data of the two images are superimposed on one another optically or electronically and made accessible to a human eye, for example, on a monitor 10 or in an ocular light path. Additional data referring to the patient from other data equipment 101 can be reflected in the superimposition device 95 and superimposed on the other image data.

The components 98a, 98b, 99, and 100a, 100b together constitute an adaptive control apparatus 97. Further information that speaks for itself, as well as the pattern in the application to a patient may be seen from FIG. 4.

Figure 2:
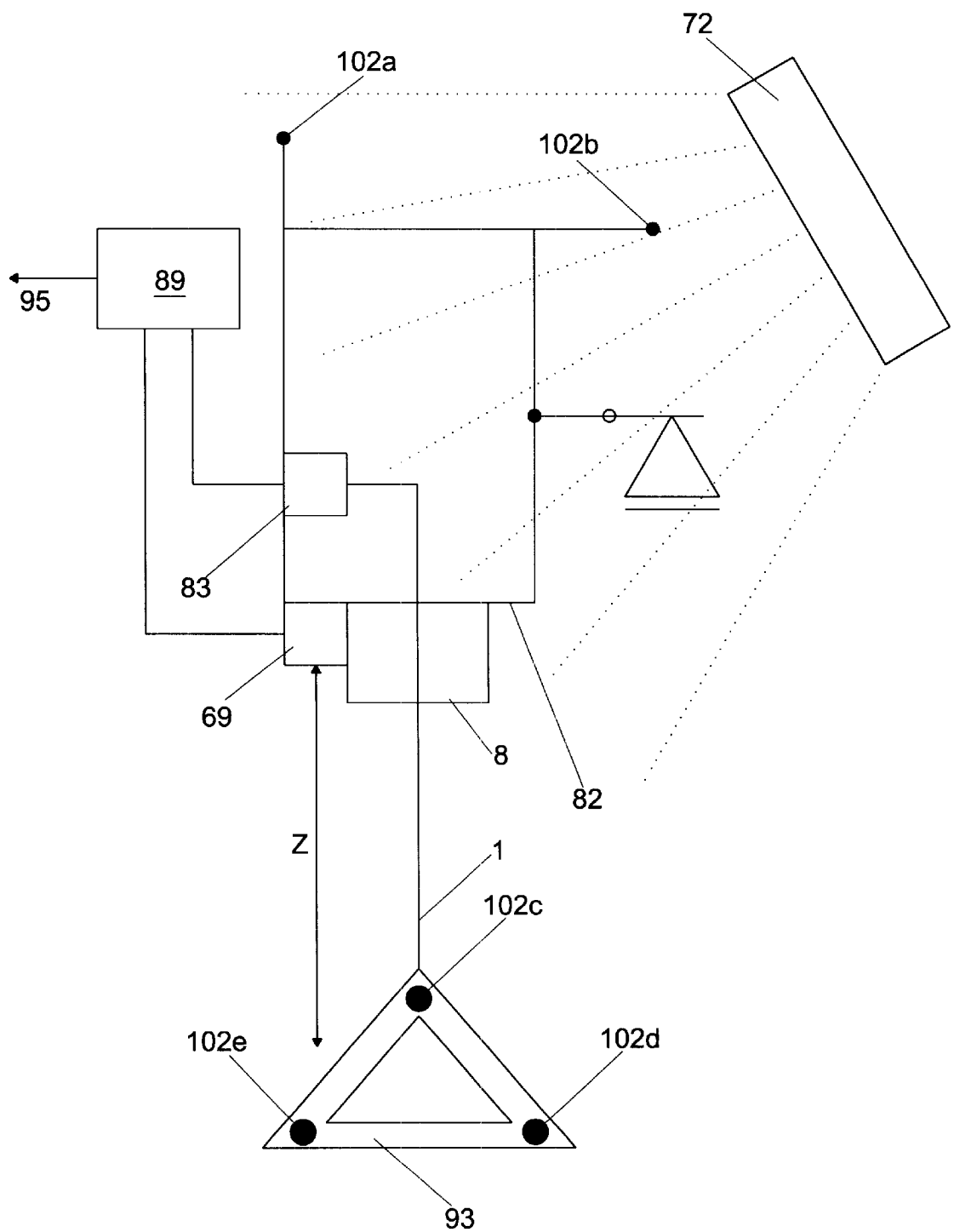

FIG. 2 shows a possibility how the position of the operation microscope and the test specimen can be determined in the framework of the invention. For this a position recognition device 72 (e. g. a PIXYS device) is rigidly mounted that operates together with the IR reflectors 102a–102e. IR light that is transmitted in the form of pulses from the device 72 is reflected from the individual reflectors from which the position of the reflectors and thereby the position of the test specimen and the microscope in space can be determined. Naturally, the parts 102a–102e can also be used as active signal transmitters whose signals are received by the device 72 and evaluated.

The microscope 82 has further a range finder 69 for determining the test specimen plane and a magnification measuring device 83, which preferably measures the magnification of the microscope optics through the main objective 8. Not shown is a CCD or similar device for converting the image viewed into image data that can be further processed electronically.

Figure 3:
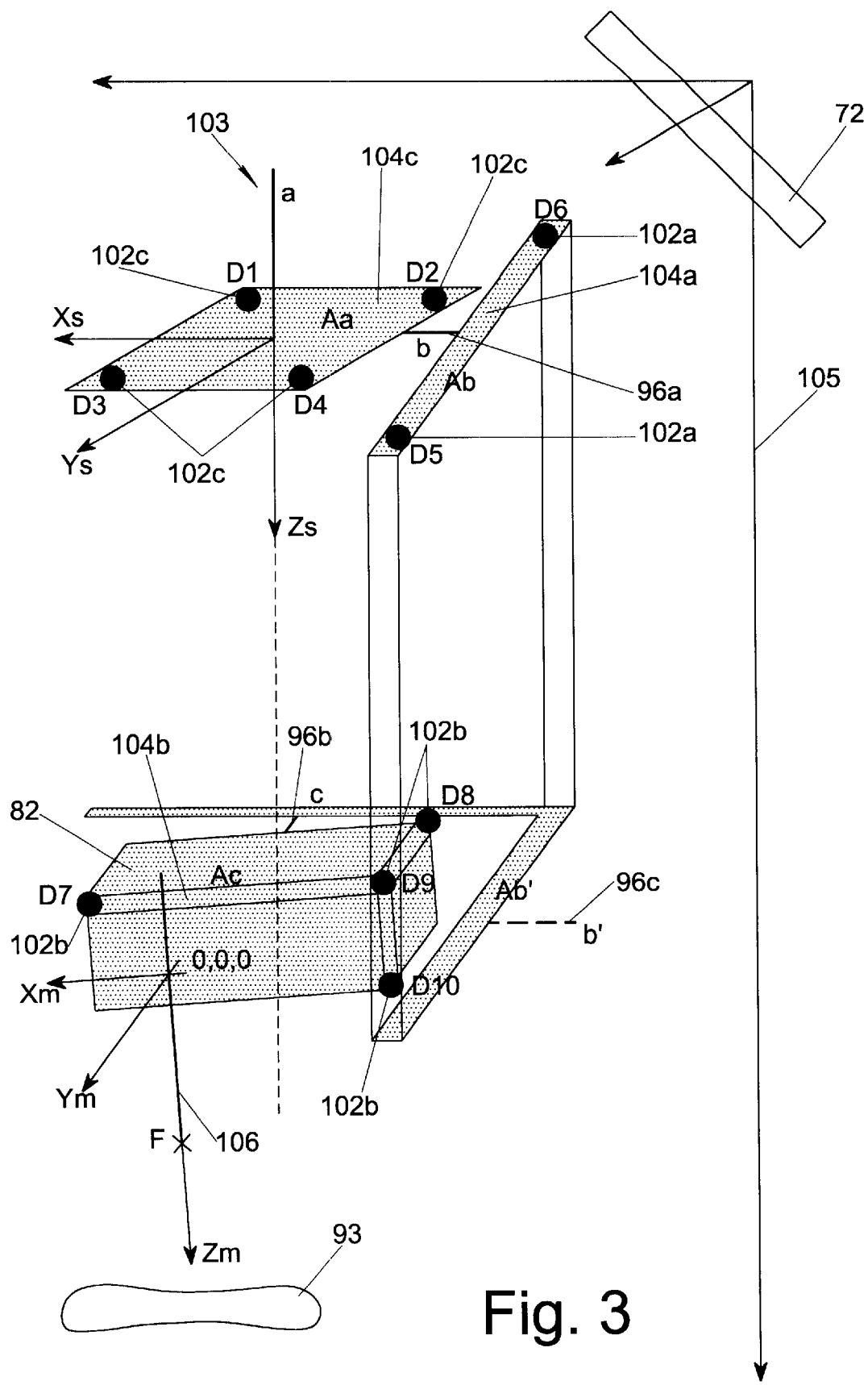

FIG. 3 also shows symbolically a microscope 82 on a stand 103 on which angular position frames 104a–104c that bear the IR reflectors or diodes are mounted in the area of its joints 96a–96c, each of which defines a swivel plane. For a better understanding of how these diodes or reflectors can preferably be designed, express reference is made to previously mentioned Swiss patent application 1089/94-5. In view of their geometric design the position frames that are portrayed are well suited to signal the correct position of the stand 103 or the operation microscope linked with it, the diodes or the reflectors 102a indicating the rotation of the microscope 82 on the axis b and the diodes or reflectors 102c defining the azimuth, rotation, and swivel position of the microscope 82, although they are mounted at a distance from the latter (assembly alternative). The diodes 102b, on the other hand, permit the position of the microscope 82 to be determined directly. Since shading may occur in the immediate vicinity of the microscope through the user, however, which may make it difficult to locate the position, the variant portrayed with the diodes 102a–102c is preferred, since on the basis of knowledge of the construction of the stand and microscope conclusions may be reached from the diodes 102a and 102c about the position of the microscope 82, to the extent that a bearing may be taken on at least one diode by the position determination system. The letters a, b, c indicate the swivel axes of the stand 103. The number 105 indicates the coordinate system of space according to which the position measuring device 72 (IR direction detectors) is oriented or to which it brings the coordinate system Xs, Ys, Zs of the stand 103 or of the microscope 82 (Xm, Ym, Zm) into relation. The number 106 represents the optical axis of the microscope, the position of which is the real goal of the position investigation and is determined mathematically based on the knowledge of the positions of the diodes 102a–102c. Based on knowledge of the position of the optical axis one can determine the eyeline of the microscope 82 in reference to the object 93, to the extent that one knows this position, which in turn can be determined with known stereotactic operating methods. In other words, the microscope 82 or its light path and the object are assigned to a common coordinate system, so that in the event of a change in the position of the microscope 82, a change in the field of vision on the object 93 that occurs can be detected by the computer and reproduced on the object. This knowledge makes possible a composite display of the affected area under the field of vision, e. g. from the set of three-dimensional X-ray data stored in the computer.

After a video camera that looks at the object 93 like the viewer eye and in the process may see the reflected or superimposed image is integrated in the microscope, further evaluation or control investigations are possible in which, for example, the edge coverage of the superimposed images are examined through image processing. In this regard a representation of the superimposed image synchronized with the recording clock of the videocamera permits where necessary a separation that is not visible to the user himself in the purely optically displayed image through the optical light path of the microscope and in the image that is electronically transformed and superimposed.

Naturally the invention also encompasses endoscopes, which, however, as a rule have a stand, so that their positioning is determined simply through diodes on the body of the endoscope. What is important in this regard is that before the endoscope is inserted into an object, the relation of the endoscope tip to the diodes on the body of the endoscope is detected and established in order to follow the tip of the endoscope—possibly displayed as a symbol—in the image through image processing with the computer.

Invisible radiation is understood to mean all media with which diagnostic data can be obtained from a patient or an object. This includes along with the electromagnetic waves also ultrasound and in the extreme case even mechanical scanning processes by means of sensors in which these scanning processes are afterwards converted by the computer into a pictorial representation of the object.

LIST OF REFERENCE NUMBERS

This list of reference numbers also contains reference numbers of figures that are contained in the applications mentioned above, since these, lying as mentioned in the framework of this invention, are regarded as being disclosed with it for combination purposes. In particular this applies to the microscope with special light paths and beam splitters and the devices to measure magnification and the distance from the microscope to the object.

1*a,b* First light path
2*a,b* Second light path (first light paths laid geometrically over one another)
3 Mechanico-optic switching element
   3*a*,3*b*,3*c* Opaque and preferably reflecting diaphragms
   3*d* LCD Shutter element
   3*e* Micromechanical lamellar mirror construction
   3*f* LCD interchangeable shutter element
4 Beam splitter
   4*a*,4*b* Beam splitter
   4*c* Beam splitter for stopping the measuring beam
5 Disk
   5*a* Semicircular area
   5*b* Remaining area of the disk 5
   5*c* Circle segment areas
   5*d*
6 Axis for disk
7 Middle axis
   7*a*,7*b* Middle axis
8 Main objective
9 Electronic image pickup device
10 Display
   10*a* Display
11*a,b* Mirror
12 *a,b,c* Adjustment device
13 Zoom
14 a,b Motor
15 Reciprocal drive
16 Power supply
17 Light source
18 Eyepiece
19 Reflex mirror
20 Push rod
21 Fixed mirror
22 Object 22*a* Object detail
23 a,b,a',b',c,d Plan-parallel plate
24 Swivel drive
25 Lever system
30 Lamellar mirror from 3*e*
31 Tube lens
32 Fading element
   (a) Beam splitter
   (b) Mirror
   (c) Second fading element
33 Magnification optics
34 Arrows
35 Further mirror
36 Servo drive
37 Beam
38*a,b* Reflex mirror
39 Retroprism
40 Counterweight
41 Holding plate a,b,c; prismatic with integrated mirror
42 Color filter
43 Interval switch
44 Microprocessor
45 Measuring array
46 Reference array a
47 Module for image data transmission
48 Outside image data input
49 Servomotor for zoom 13 a,b
50 Connecting lines a–g
51 Magnification display a,b,c
52 Cam 53 Coupling
  (a) Between servomotor 49 and zoom 13
  (b) Between cam 52 and magnification display 51b
54 Mechanical pickup
55 a,b Indicator
56 Laser
57 Measuring beam a,b,c,cl
58 Reference beam
59 Arrows for adjustability of the fading element 32
60 Microscope light path a-e
61 First deviation element a
62 Focussing element a,b
63 Light conductor end piece a,b
64 Light source a
65 Second deviation element
66 Sensor
67 Distance range a
68 Connecting line
69 Distance measuring system
70 Connection
71 Magnification measuring unit
72 Position determining system a,b
73 Interferometer
74 Semitransparent mirror
75 Reflector
76 Detector
77 Electromechanical adjustment element
78 Interferometer control
79 Grid
80 Detector CCD
81 Stages
82 Microscope
83 Device for measuring the magnification of the microscope
84 Device for measuring the distance from object to microscope
85 Position measuring system for determining the absolute position of the microscope in space in order to be able to draw conclusions about the position of the visual field on the object too based on knowledge of the distance from object to microscope
86 Toolbox for various user programs
87 Command control element (computer mouse)
88 Command control element for controlling the movement of the microscope (e. g. foot switch)
89 Data preparation unit
90 Computer (workstation)
91 Control switch for microscope
92 Electromechanical control unit for microscope (zoom, focus, etc.)
93 Object
94 Second apparatus (e. g. MRI or CT equipment)
95 Superimposition device
96a–c Joint on stand
97 Adaptive control apparatus
98a,b Recognition unit
99 Memory
100a Correction unit
101 Patient data equipment
102a–e IR reflectors or IR diodes
103 Position frames
105 Coordinate system of the space
106 Optical axis
b Interval of the measurement rays 57a and 57b
b' Interval of the measurement rays 57a and 57b on the measurement array
d1,2 Stereo base
$X_m, Y_m, Z_m$ Coordinates of the microscope 82
$X_s, Y_s, Z_s$ Coordinates of the stand 103
F Focal point of the microscope 82

What is claimed is:

1. In an image representing device used with a microscope for detecting visible pictorial information concerning an object with visible light and a secondary apparatus for detecting invisible pictorial information concerning said object which is initially hidden from a viewer's eye, said image representing device having means for superimposing said visible pictorial information and said invisible pictorial information into a single image, the improvement comprising:

adaptive control means for detecting change in three-dimensional geometric imaging parameters of said microscope occurring as a result of adjustment of said microscope and for using said detected change to correct said invisible pictorial information to coincide geometrically with said visible pictorial information, wherein said geometric imaging parameters include primary imaging parameters comprising microscope alignment, viewing angle, and magnification of the microscope light path, and secondary imaging parameters comprising visual field and depth of focus.

2. The improvement according to claim 1, wherein said geometric imaging parameters further include tertiary imaging parameters comprising aberration of the metric and distortion.

3. The improvement according to claim 1, wherein said microscope includes a range finder for determining a z-distance to said object and a magnification measuring device, and said adaptive control means is responsive to parameters determined by said range finder and said magnification measuring device.

4. The improvement according to claim 3, wherein said adaptive control means includes memory means for storing predetermined correction information for use in correcting said invisible pictorial information.

5. The improvement according to claim 2, wherein said adaptive control means includes memory means for storing predetermined correction information for use in correcting said invisible pictorial information.

6. The improvement according to claim 4, wherein said correction information includes correction algorithms which are type-specific to said microscope light path.

7. The improvement according to claim 5, wherein said correction information includes correction algorithms which are type-specific to said microscope light path.

8. The improvement according to claim 7, wherein said correction information includes a plurality of computational formulas which are series-specific to said microscope, said computational formulas being derived from a prior calibration of said adaptive control means with said microscope through a range of microscope adjustments.

9. The improvement according to claim 8, wherein a standardized object of known geometry is observed during said prior calibration, and said standardized object is uniformly detectable for rays of said microscope and said secondary apparatus.

10. The improvement according to claim 3, wherein said adaptive control means includes a data preparation unit for calculating adaptation parameters for proportionally correct scaling of said invisible pictorial information to coincide with said visible pictorial information.

11. A process for superimposing initially different first and second image data, said first image data coming from a first apparatus and said second image data coming from a second apparatus, comprising the steps of:

(A) providing a standardized object having a known geometry described by actual dimensional data;

(B) converting said actual dimensional data into a reference voxel volume representative of said known geometry and storing said reference voxel volume in memory;

(C) placing said standardized object before said first apparatus and detecting calibration image data of said standardized object from a plurality of different perspectives;

(D) converting said calibration image data of said standardized object into a calibration voxel volume representative of said standardized object as observed through said first apparatus subject to primary, secondary, and tertiary imaging parameters of said first apparatus;

(E) comparing said calibration voxel volume with said reference voxel volume to derive a first computational formula based on differences between said reference and calibration voxel volumes, and storing said first computational formula;

(F) modifying said second image data using said first computational formula to improve congruence between said first and second image data;

(G) superimposing said first and second image data on one another; and (H) presenting said superimposed image data to a viewer.

12. The process according to claim 11, further including the steps of:

(A) placing said standardized object before said second apparatus and detecting additional calibration image data of said standardized object from a plurality of different perspectives;

(B) converting said additional calibration image data of said standardized object into an additional calibration voxel volume representative of said standardized object as observed through said second apparatus subject to secondary and tertiary imaging parameters of said second apparatus;

(C) comparing said additional calibration voxel volume with said reference voxel volume to derive a second computational formula based on differences between said reference and additional calibration voxel volumes, and storing said second computational formula; and (D) modifying said first image data using said second computational formula to further improve congruence between said first and second image data.

13. The process according to claim 11, wherein said first apparatus is continuously adjusted and said second image data is continuously modified using said first computational formula as said first apparatus is adjusted.

14. The process according to claim 11, further including the step of superimposing adjustment data describing the adjustment status of said first apparatus on said superimposed image data presented to said viewer.

* * * * *

UNITED STATES PATENT AND TRADEMARK OFFICE
CERTIFICATE OF CORRECTION

PATENT NO.   : 6,483,948 B1
DATED        : November 19, 2002
INVENTOR(S)  : Spink et al.

It is certified that error appears in the above-identified patent and that said Letters Patent is hereby corrected as shown below:

<u>Title page,</u>
Item [22], "December 22, 1994" should be -- December 22, 1995 --

Signed and Sealed this

First Day of April, 2003

JAMES E. ROGAN
*Director of the United States Patent and Trademark Office*